United States Patent
Ghosal et al.

(10) Patent No.: US 6,627,325 B1
(45) Date of Patent: Sep. 30, 2003

(54) ELASTOMERIC MATERIAL FOR RUBBER ARTICLES

(75) Inventors: Kanchan Ghosal, Garland, TX (US); Venkataram Krishnan, Cary, NC (US)

(73) Assignee: Dow Reichhold Specialty Latex LLC, Research Triangle Park, NC (US)

( * ) Notice: Subject to any disclaimer, the term of this patent is extended or adjusted under 35 U.S.C. 154(b) by 1033 days.

(21) Appl. No.: 09/128,912

(22) Filed: Aug. 4, 1998

Related U.S. Application Data

(62) Division of application No. 08/864,718, filed on May 28, 1997, now abandoned.

(51) Int. Cl.$^7$ .................. B28B 27/00; C08F 120/06; C08F 220/44
(52) U.S. Cl. ................ 428/500; 526/317.1; 526/318.6; 526/342; 428/35.7
(58) Field of Search ............... 428/35.7, 36.8, 428/36.9, 36.91; 526/317.1, 318.6, 342

(56) References Cited

U.S. PATENT DOCUMENTS

| | | | |
|---|---|---|---|
| 2,527,162 A | 10/1950 | Vanderbilt et al. ......... 260/80.7 |
| 2,574,894 A | 11/1951 | Snyder et al. ............. 260/84.3 |
| 2,575,135 A | 11/1951 | Schulze et al. ............ 260/84.1 |
| 2,959,821 A * | 11/1960 | Kolb .......................... 18/58.6 |
| 3,174,953 A | 3/1965 | Ogle .......................... 260/83.7 |
| 3,756,974 A * | 9/1973 | Buchheim et al. .......... 260/29.7 |
| 4,102,844 A | 7/1978 | Schwinum et al. ...... 260/29.7 T |
| 4,429,074 A | 1/1984 | Mishiba et al. ............. 524/819 |
| 4,480,078 A | 10/1984 | Gujarathi ..................... 526/65 |
| 4,508,864 A | 4/1985 | Lee ............................. 524/187 |
| 4,537,916 A * | 8/1985 | Bruschtein et al. ......... 523/201 |
| 4,963,623 A | 10/1990 | Miller et al. ................. 525/237 |
| 5,014,362 A | 5/1991 | Tillotson et al. ................ 2/168 |
| 5,039,750 A | 8/1991 | Miller et al. ................. 525/237 |
| 5,045,611 A | 9/1991 | McNeil ........................ 526/81 |
| 5,084,514 A * | 1/1992 | Szczechura et al. |
| 5,177,164 A | 1/1993 | De Vries et al. .............. 526/82 |
| 5,206,319 A | 4/1993 | Kobayashi et al. ......... 526/224 |
| 5,284,157 A | 2/1994 | Miller et al. ................. 128/844 |
| 5,284,607 A | 2/1994 | Chen ........................... 264/37 |
| 5,338,565 A | 8/1994 | Shlenker et al. ........... 427/2.25 |
| 5,370,900 A | 12/1994 | Chen .......................... 427/2.3 |
| 5,466,739 A | 11/1995 | Maeda et al. ............... 524/525 |
| 5,484,840 A | 1/1996 | Binkley ...................... 525/501 |
| 5,514,763 A | 5/1996 | Kmiecik-Lawrynowicz et al. .......................... 526/340 |

FOREIGN PATENT DOCUMENTS

| | | |
|---|---|---|
| CA | 795706 | 2/1956 |
| DE | 3406231 A1 | 2/1984 |

OTHER PUBLICATIONS

Reichhold Product Bulletin (Jan. 1993) (Tylac® Synthetic Rubber Latex 97882–00.

* cited by examiner

*Primary Examiner*—Harold Pyon
(74) *Attorney, Agent, or Firm*—Myers Bigel Sibley & Sajovec, PA

(57) ABSTRACT

A polymer latex composition suitable for rubber articles comprises about 5 to about 65 weight percent of an aromatic vinyl monomer, about 35 to about 90 weight percent of a conjugated diene monomer, and about 0.5 to about 10 weight percent of a component selected from the group consisting of an unsaturated acid monomer, a partial ester of an unsaturated polycarboxylic acid, and mixtures thereof. The polymer latex composition has a gel content of no more than about 85 percent.

19 Claims, No Drawings

ELASTOMERIC MATERIAL FOR RUBBER ARTICLES

CROSS-REFERENCE TO RELATED APPLICATIONS

The instant application is a divisional application of Ser. No. 08/864,718 filed May 28, 1997 now abandoned.

FIELD OF THE INVENTION

The invention relates to polymer latex compositions useful in making rubber articles. More specifically, the invention relates to polymer latex compositions which are capable of forming materials possessing a combination of physical properties.

BACKGROUND OF THE INVENTION

Rubber articles such as gloves, condoms, bags, and the like are formed of latex polymeric materials and are useful in a wide variety of applications relating to, for example, medical, industrial, and household uses. These polymeric materials are generally water-based polymers which are readily formed using commercially-known processes. In such processes, it is important that the latex material be able to form a film on the surface of a mold. An example of such use relates to the making of latex gloves. These gloves are generally desirable since they can be made light, thin, flexible, tight-fitting, and substantially impermeable to liquids and gases. It is often desirable that the gloves possess adequate physical properties such as tensile strength and elongation.

It is desirable that the gloves be soft and comfortable to wear, and also provide a barrier to microbial penetration. A combination of high tensile strength and elongation combined with a low modulus is typically preferred. A lower modulus and a high elongation usually translate to a more flexible and comfortable glove. Additionally, the glove must have sufficient snap or elastic recovery.

Conventional latex gloves have typically been formed of natural rubber due to their resiliency and adequate physical properties. Nonetheless, many wearers of such gloves are allergic to proteins found in natural rubber. These individuals often experience difficulty when wearing the gloves. As a result, there have been efforts to develop gloves made from synthetic materials which are comparable to the natural rubber gloves in terms of comfort and physical properties. One synthetic alternative focuses on using poly (vinylchloride) (PVC). PVC is typically plasticized in order to be pliable enough to use in glove applications. Gloves formed from PVC are undesirable in many respects. For example, the gloves are usually very stiff and uncomfortable to the wearer. Furthermore, the plasticizer may migrate through the PVC and leach out when in contact with solvents. Also, it is believed that synthetic gloves formed from vinyl materials may provide an insufficient barrier to microbes due to imperfections in the film.

Another possible alternative to gloves made of natural rubber is described in U.S. Pat. No. 5,014,362 to Tillotson et al. The Tillotson et al. patent proposes gloves made with elastomeric material which allegedly possess adequate physical properties relating to fluid permeability, strength, and resilience. The gloves are taught to be formed from a nitrile-containing rubber, more particularly a carboxylated nitrile containing butadiene rubber. Nitrile-containing rubber gloves are typically desirable in demanding end use applications, such as those which often require superior properties such as solvent and puncture resistance. Nonetheless, for more general, less demanding applications, it is often not necessary for the gloves to exhibit such properties.

Latex polymers formed of styrene and butadiene have been utilized in attempting to make synthetic gloves. Nonetheless, these materials have largely been unsuccessful in that they typically are unable to "dip" effectively, i.e., coagulate to form a thin, uniform, defect-free film. Furthermore, the thin film usually does not possess sufficient physical properties to be used alone as a glove. For the most part, it is desirable to provide a thin film glove which is comfortable to use and provide sufficient barrier to microbes and chemicals. Accordingly, the glove should have a high tensile strength, high elongation, and low modulus. This combination of properties is typically difficult to achieve since films with high tensile strength tend to have a low elongation and a high modulus.

A need in the art remains for a synthetic latex material suitable in forming rubber articles which is free of natural rubber proteins and which can provide a wide range of desirable physical properties relating to strength, elongation, and modulus, as well as providing adequate comfort properties to the user. It is also desirable to produce a glove from materials which are cost competitive with natural rubber for general purpose applications.

SUMMARY OF THE INVENTION

In view of the above, it is an object of the present invention to provide a polymer latex suitable in forming rubber articles which is free of natural rubber and imparts desirable physical properties to articles made therefrom.

To this end and others, in one aspect, the present invention provides a polymer latex composition suitable for making rubber articles. The composition comprises from about 5 to about 65 weight percent of an aromatic vinyl monomer from about 35 to about 90 weight percent of a conjugated diene monomer, and about 0.5 to about 10 weight percent of a component selected from the group consisting of an unsaturated acid monomer, a partial ester of an unsaturated polycarboxylic acid monomer, and mixtures thereof. The weight percents are based on the total weight of the monomers. A preferred aryl vinyl monomer is styrene. A preferred conjugated diene monomer is 1,3-butadiene. A preferred component is an unsaturated mono- or dicarboxylic acid monomer.

In another aspect, the invention provides a crosslinked film formed from a polymer latex composition. Preferably, the crosslinked film has a tensile strength of at least about 1000 psi, an elongation of at least about 400 percent, and a modulus at 100 percent elongation of no more than about 500 psi.

In yet another aspect, the invention provides a glove formed from the polymer latex composition of the invention. Preferably, the glove has a tensile strength of at least about 1000 psi, an elongation of at least about 400 percent, and a modulus at 100 percent elongation of no more than about 500 psi.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The invention relates to a polymer latex composition suitable for making rubber articles. The polymer latex composition comprises from about 5 to about 65 weight percent of an aromatic vinyl monomer, from about 35 to about 90 weight percent of a conjugated diene monomer, and about 0.5 to about 10 weight percent of a component selected from the group consisting of an unsaturated acid monomer, a partial ester of an unsaturated polycarboxylic acid, and mixtures thereof. The weight percents are based on the total weight of the monomers.

For the purposes of the invention, the term "aromatic vinyl monomer" is to be broadly interpreted and include, for example, aryl and heterocyclic monomers. Exemplary aromatic vinyl monomers which may be employed in the polymer latex composition include, for example, styrene and styrene derivatives such as alpha-methyl styrene, p-methyl styrene, vinyl toluene, ethylstyrene, tert-butyl styrene, monochlorostyrene, dichlorostyrene, vinyl benzyl chloride, vinyl pyridine, fluorostyrene, alkoxystyrenes (e.g., paramethoxystyrene), and the like, along with blends and mixtures thereof. In addition to the composition range stated herein, the aromatic vinyl monomer may be used in an amount, based on the total weight of the monomers, preferably from about 5 to about 50 percent by weight, and most preferably from about 10 to about 40 percent by weight. A particularly preferred aromatic vinyl monomer is styrene.

Suitable conjugated diene monomers that may be used include, but are not limited to, $C_4$ to $C_9$ dienes such as, for example, butadiene monomers such as 1,3-butadiene, 2-methyl-1,3-butadiene, 2 chloro-1,3-butadiene, and the like. Blends or copolymers of the diene monomers can also be used. In addition to the composition range set forth herein, the conjugated diene may be used in an amount, based on the total weight of the monomers, preferably from about 40 to about 90 percent by weight, more preferably from about 55 to about 80 percent by weight. For a glove material with a softer feel, it-is particularly desirable to use from about 60 to about 95 percent by weight of a conjugated diene monomer. A particularly preferred conjugated diene is 1,3-butadiene.

A number of unsaturated acid monomers may be used in the polymer latex composition. Exemplary monomers of this type include, but are not limited to, unsaturated mono- or dicarboxylic acid monomers such as acrylic acid, methacrylic acid, itaconic acid, fumaric acid, maleic acid, and the like. Derivatives, blends, and mixtures of the above may be used. Methacrylic acid is preferably used.

Suitable partial esters of unsaturated polycarboxylic acid monomers which may be added to the polymer latex composition are numerous. These monomers typically include unsaturated di- or higher acid monomers in which at least one of the carboxylic groups is esterified. One example of this class of monomers is of the formula ROOC—CH=CH—COOH wherein R is a $C_1$ to $C_{12}$ alkyl group, for example monomethyl maleate, monobutyl maleate and monooctyl maleate. Half esters of itaconic acid having $C_1$ to $C_{12}$ alkyl groups such as monomethyl itaconate can also be used. Other half esters, such as those in which R in the above formula is an oxyalkylene chain instead of alkyl can also be used. Blends or copolymers of the partial ester of the unsaturated polycarboxylic acid monomer can also be used.

In addition to the composition range set forth above, the unsaturated acid monomers, or partial esters of unsaturated polycarboxylic acid monomers, or mixtures thereof, may be used in a preferred amount ranging from about 1.5 to about 5 percent based on the total monomer.

A number of additional components may be used in the polymer latex composition of the present invention. For example, nitrogen-containing monomers, for example, acrylamide-based monomers may be employed and include, for example, acrylamide, N-methyolacrylamide, N-methyolmethacrylamide, methacrylamide, N-isopropylacrylamide, N-tert-butylacrylamide, N—N'-methylene-bis-acrylamide; alkylated N-methylolacrylamides such as N-methoxymethylacrylamide and N-butoxymethylacrylamide; and nitriles such as acrylonitrile and methacrylonitrile. Blends and mixtures of the above may be used.

The polymer latex composition may also include non-aromatic unsaturated monocarboxylic ester monomers such as, for example, acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate, and the like. Exemplary amino-functional methacrylates include t-butylamino ethyl methacrylate and dimethylamino ethyl methacrylate. Suitable non-aromatic dicarboxylic ester monomers may also be used such as, for example, alkyl and dialkyl fumarates, itaconates and maleates, with the alkyl group having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like. The mono and dicarboxylic acid esters monomers may be blended or copolymerized with each other. Other monomers such as vinyl esters, vinyl halides, and vinylidene halides may also be used.

The polymer latex composition may also include other components such as, for example, urethanes, epoxies, melamine-formaldehyde resins, and conjugated diene polymers (e.g., polybutadiene, polyisoprene, and polychloroprene). Blends, derivatives, and mixtures thereof may also be used.

Conventional surfactants and emulsifying agents can be employed in the polymer latex composition. Polymerizable surfactants that can be incorporated into the latex also can be used. For example, anionic surfactants can be selected from the broad class of sulfonates, sulfates, ethersulfates, sulfosuccinates, diphenyloxide disulfonate, and the like, the selection of which is readily apparent to anyone skilled in the art. Nonionic surfactants may also be used to improve film and glove characteristics, and may be selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols. Ethoxylated alcohols are also desirable surfactants. A typical anionic surfactant is selected from the diphenyloxide disulfonate family, such as benzenesulfonic acid, dodecyloxydi-, disodium salt.

An initiator which facilitates polymerization of the latex composition may include, for example, materials such as persulfates, organic peroxides, peresters, and azo compounds such as azobis(isobutyronitrile) (AIBN). Common initiators include those such as, for example, cumene hydroperoxide, diisopropylbenzene hydroperoxide, and tert butyl hydroperoxide. Preferred initiators are persulfate initiators such as, for example, ammonium persulfate and potassium persulfate. Redox initiators which are well known to one skilled in the art can also be used.

The polymer can include crosslinking agents and other additives, the selection of which will be readily apparent to one skilled in the art. Exemplary crosslinking agents include vinylic compounds (e.g., divinyl benzene); allyllic compounds (e.g., allyl methacrylate, diallyl maleate); and multifunctional acrylates (e.g., di, tri and tetra (meth)acrylates), sulfur and metal oxides (e.g., zinc oxide). Peroxides may also be used. Additional ingredients which may be used include, but are not limited to, chelating agents (e.g., ethylenediaminetetraacetic acid), dispersants (e.g., salts of condensed naphthalenesulfonic acid); buffering agents (e.g., ammonium hydroxide); and polymerization inhibitors (e.g., hydroquinone). Chain transfer agents (e.g., t-dodecyl mercaptan) may also be used in the invention, preferably less than about 2 percent based on the weight of the monomers. More preferably, the chain transfer agent is used from about 0.3 to about 1.5 weight percent, and most preferably from about 0.3 to about 1.0 weight percent.

The monomers used in forming the polymer latex composition of the invention may be polymerized in a manner known to those who are skilled in the art. For example, the monomers may be polymerized-at a temperature preferably between about 40° F. and 200° F., and more preferably between about 50° F. and 150° F.

In accordance with the invention, the polymer latex composition has a gel content of no more than about 85 percent, preferably no more than about 75 percent, and more preferably no more than about 50 percent. Most preferably, the polymer latex composition has a gel content of no more than 30 percent. For the purposes of the invention, the term "gel content" refers to the level (percent) of internal crosslinking within the polymer latex composition. More specifically, gel content can be thought of as the insoluble fraction of the polymer latex composition. The gel content can be determined by accepted techniques. One technique focuses on coagulating the latex composition in isopropyl alcohol and then drying the composition. The fraction of the dried composition which is insoluble in toluene is defined as the percent gel content.

Although Applicants do not wish to be bound by any theories, it is believed that percent gel content may be influenced by several factors such as, for example, temperature, extent of conversion, rate of reaction, reaction time, catalyst concentration, chain transfer agent concentration, and crosslinking agent concentration.

The polymer latex composition of the invention may also have various polystyrene equivalent weight average molecular weight values. The term polystyrene equivalent weight average molecular weight refers to the molecular weight of the soluble fraction of the polymer in tetrahydrofuran, THF. The procedure for determining this value is known by those who are skilled in the art. Typically, the molecular weight of the soluble fraction of the polymer is determined by using gel permeation chromatography (GPC). Preferably, the polymer latex composition has a polystyrene equivalent weight average molecular weight ranging from about 40,000 to about 500,000, and more preferably from about 70,000 to about 400,000.

The invention also relates to a crosslinked film formed from a polymer latex composition described herein. Numerous articles of manufacture can be formed from the crosslinked film and polymer latex composition according to the process of the invention. Such latex articles generally include those which are typically made from natural rubber and which contact the human body. Exemplary articles of manufacture include, but are not limited to, gloves, condoms, medical devices, catheter tubes, balloons, and blood pressure bags. Exemplary techniques are described in U.S. Pat. No. 5,084,514 to Szczechura et al., the disclosure of which is incorporated by reference herein in its entirety. Typically, the polymer latex composition is compounded with one or more crosslinkers (e.g., metal oxides such as zinc oxide, sulfur, and peroxides), along with antioxidants, fillers, and other ingredients. The compounding or mixing may be done in any suitable manner. Suitable forms or molds in the shape of a hand are heated in an oven, and then immersed or dipped into a coagulant. A suitable coagulant includes, for example, a solution of a metal salt, preferably calcium nitrate, in water or alcohol. The form is then withdrawn from the coagulant, and the excess liquid is permitted to dry. As a result, a residual coating of coagulant is left on the form.

The form coated with the coagulant is then immersed or dipped into the polymer latex composition of the present invention. The latex coagulates and forms a film on the form. The amount of time the form is immersed in the latex typically determines the thickness of the film. The longer the dwell time, the thicker the film.

The form is then removed from the latex, and is immersed in a water bath to remove the coagulant and some of the surfactant. The latex coated form is then placed in a drying oven at a temperature preferably between about 60° C. and about 100° C. to remove water from the film. When the film is dry, the mold is placed in a curing oven preferably at a temperature between about 100° C. and 170° C. for about 5 to about 30 minutes. If desired, the same oven can be used for drying and curing, and the temperature can be increased with time.

The cured glove is removed from the form. It may be powdered or post-processed for ease of removal and for ease of donning. The glove preferably has a thickness ranging from about 3 mil to about 20 mil.

The crosslinked film and glove formed in accordance with the present invention may have various physical properties. Preferably, the above materials have a tensile strength of at least about 1000 psi, an elongation of at least about 400 percent, and a modulus at 100 percent elongation of no more than about 500 psi. More preferably, the materials have a tensile strength of at least about 1500 psi, an elongation of at least about 450 percent, and a modulus at 100 percent elongation of no more than about 450 psi. Most preferably, the materials have a tensile strength of at least about 2000 psi, an elongation of at least about 500 percent, and a modulus at 100 percent elongation of no more than about 400 psi.

The crosslinked film or glove of the invention may have various percent area swell values. Percent area swell is usually determined in xylene in accordance with ASTM Test No. D-471 and is an index of crosslink density of the crosslinked film. Preferably, the crosslinked film has a percent area swell of greater than about 300 percent.

In addition to the above, the crosslinked film and glove produced in accordance with the invention can contain additional (at least a second) polymeric films in contact thereto so as to form composite structures. The application of the additional polymeric films may be achieved by techniques which are known in the art. For example, the polymeric films may be formed on the crosslinked film and glove by coating, spraying, or "overdipping". The resulting materials may then be dried and cured in accordance with known and accepted techniques. The additional polymeric films may be formed from a wide number of materials including, but not limited to, neoprene, nitrites, urethanes, acrylics, polybutadiene, polyisoprene, and the like. Mixtures of the above may also be used. The additional polymeric films may be present in a variety of configurations. For example, in one embodiment, an additional film may be positioned above the crosslinked film. In a second embodiment, an additional film may be positioned below the crosslinked film. In a third embodiment, the crosslinked film may be located between two additional films. The configurations of different films may be selected as desired by the skilled artisan.

The following examples are merely illustrative of the invention, and are not limiting thereon.

EXAMPLE 1

150 parts per hundred of monomer (phm) of demineralized water is charged into a 1-gallon reactor. To this is added, 61 phm of butadiene, 34 phm of styrene, and 5 phm of methacrylic acid, along with 0.05 phm ethyenediaminetetracetic acid (EDTA), 2 phm of surfactant, (i.e., benzenesulfonic acid, dodecyloxydi-, disodium salt), 0.6 phm of t-dodecyl mercaptan, 0.05 phm of potassium persulfate, and 0.3 phm of sodium salt of condensed naphthalenesulfonic acid in a stirred reactor. The above mixture is agitated and the temperature raised to 120° F. The temperature is incrementally raised to 140° C. After 12.5 hrs, the reaction was stopped by the addition of hydroquinone. The conversion was determined to be 91.5 percent. The pH of the latex is raised to 7 to 7.5 by using ammonium hydroxide. The latex is then concentrated to a total solids content of 44.9 percent and a viscosity of 130 cps. The latex has a 9 percent gel content.

The latex is combined with 0.5 phm of sodium dodecyl benzene sulfonate, and its pH is raised to 8.5 using NH$_4$OH. The latex is further compounded with 0.25 phr of zinc dibutyl dithiocarbamate, 0.5 phr of sulfur, and 1 phr of ZnO.

EXAMPLE 2

The compounded latex made in Example 1 is coagulated onto a form and the film crosslinked as follows. At a temperature of 70° C., a form is immersed into a coagulant (35 percent solution of calcium nitrate in water), partially dried, and then immersed in the latex for 5 to 60 seconds. A 5 to 10 mil film of polymer is deposited on the form. The film is dried on the form for 2 to 5 minutes, leached in warm water, and dried in an oven at 70° C. for 20 minutes. The film is finally cured for 10 minutes at 132° C.

The tensile properties of the film were measured using ASTM D-412 and are given below:

| M100 | M200 | M300 | M400 | M500 | $T_b$ | e % |
|------|------|------|------|------|-------|-----|
| 227  | 323  | 432  | 580  | 790  | 1309  | 661 |

M100–M500: modulus (psi)
$T_b$: tensile strength (psi)
e %: percent elongation

The area swell of the film in xylene using ASTM D-471 was determined to be greater than 500 percent.

EXAMPLE 3

A latex composition similar to that in Example 1 was prepared with 62 phm butadiene, 34 phm styrene, and 4 phm methacrylic acid. The latex is then concentrated to a total solids content of 43.8 percent and a viscosity of 90 cps. The latex had a 6 percent gel content. The polystyrene equivalent weight average molecular weight of the soluble fraction was determined to be 215,000. This latex was made into a coagulated film using the procedure outlined in Example 2 except that 2.5 phr of zinc oxide, 1 phr of sulfur, and 0.5 phr of zinc butyl dithiocarbamate was used.

The tensile properties of the film were measured using ASTM D-412 and are given below:

| M100 | M200 | M300 | M400 | M500 | $T_b$ | e % |
|------|------|------|------|------|-------|-----|
| 365  | 592  | 862  | 1268 | 1861 | 2507  | 576 |

The area swell of the film in xylene using ASTM D-471 was determined to be greater than 500 percent.

EXAMPLE 4

A latex composition similar to that in Example 1 was prepared with 63 phm butadiene, 34 phm styrene, and 3 phm methacrylic acid. The latex is then concentrated to a total solids content of 44.5 percent and a viscosity of 100 cps. The latex had an 8 percent gel content. The polystyrene equivalent weight average molecular weight of the soluble fraction was 225,000. This latex was made into a coagulated film using the procedure outlined in Example 2 except that 1.5 phr of zinc oxide was used.

The tensile properties of the film were measured using ASTM D-412 and are given below:

| M100 | M200 | M300 | M400 | M500 | $T_b$ | e % |
|------|------|------|------|------|-------|-----|
| 186  | 279  | 383  | 523  | 758  | 1705  | 693 |

The area swell of the film in xylene using ASTM D-471 was determined to be greater than 300 percent.

EXAMPLE 5

A latex composition similar to Example 1 was prepared with 61 phm of butadiene, 34 phm of styrene, and 5 phm of methacrylic acid. The latex is concentrated to a total solids of 43.4 percent and a viscosity of 80 cps. The latex had a 78 percent gel content. The latex is compounded with 0.5 phm of sodium dodecyl benzene sulfonate, and its pH is raised to 8.5 using NH$_4$OH. The latex is further compounded with 1 phr of zinc oxide, 0.5 phr of sulfur, and 0.25 phr of zinc butyl dithiocarbamate.

The compounded latex is coagulated onto a metal plate, and the film crosslinked as follows. At a temperature of 70° C., a metal plate is immersed into a coagulant (35 percent solution of calcium nitrate in alcohol), partially dried, and then immersed in the latex for 60 seconds. A 8 to 14 mi film of polymer is deposited on the plate. The film is leached in warm water, and dried in an oven at 70° C. for 2 hours. The film is finally cured for 15 minutes at 132° C.

The tensile properties of the film were measured using ASTM D-412 and are given below:

| M100 | M200 | M300 | M400 | M500 | $T_b$ | e % |
|------|------|------|------|------|-------|-----|
| 308  | 443  | 595  | 818  | 1194 | 2187  | 632 |

In the specification and examples, there have been disclosed typical preferred embodiments of the invention-and, although specific terms are employed, they are used in a generic and descriptive sense only and not for purposes of limitation of the scope of the invention being set forth in the following claims.

That which is claimed is:

1. A crosslinked film formed from a polymer latex composition, said polymer latex composition comprising:
   about 5 to about 65 weight percent of an aromatic vinyl monomer;
   about 35 to about 90 weight percent of a conjugated diene monomer; and
   about 0.5 to about 10 weight percent of a component selected from the group consisting of an unsaturated acid monomer, a partial ester of an unsaturated polycarboxylic acid monomer, and mixtures thereof;
   said polymer latex composition being devoid of natural rubber;
   wherein said crosslinked film has a degree of crosslinking such that the film has a tensile strength of at least about 1000 psi, an elongation of at least 400 percent, and a modulus at 100 percent elongation of no more than about 500 psi.

2. The crosslinked film according to claim 1, wherein said crosslinked film has a percent area swell of greater than about 300 percent.

3. The crosslinked film according to claim 1, wherein said polymer latex composition has a gel content of no more than about 85 percent.

4. The crosslinked film according to claim 1, wherein said aromatic vinyl monomer is styrene.

5. The crosslinked film according to claim 1, wherein said conjugated diene monomer is butadiene.

6. The crosslinked film according to claim 1, wherein said component is an unsaturated acid monomer.

7. The crosslinked film according to claim 1, wherein said polymer latex composition further comprises a component selected from the group consisting of a urethane, epoxies, melamine-formaldehyde resins, a conjugated diene polymer, and blends thereof.

8. The crosslinked film according to claim 1, said polymer latex composition comprising:
   about 10 to about 40 weight percent of an aromatic vinyl monomer;
   about 55 to about 80 weight percent of a conjugated diene monomer; and
   about 1.5 to about 5 weight percent of a component selected from the group consisting of an unsaturated acid monomer, a partial ester of an unsaturated polycarboxylic acid monomer, and mixtures thereof.

9. The crosslinked film according to claim 1, further comprising a second polymeric film in contact with said crosslinked film to form a composite film structure.

10. A glove comprising a crosslinked film formed from a polymer latex composition, the polymer latex composition comprising about 5 to about 65 weight percent of an aromatic vinyl monomer, about 35 to about 90 weight percent of a conjugated diene monomer, and about 0.5 to about 10 weight percent of a component selected from the group consisting of an unsaturated acid monomer, a partial ester of an unsaturated polycarboxylic acid monomer, and mixtures thereof, the polymer latex composition being devoid of natural rubber; wherein said film has a degree of crosslinking such that said glove has a tensile strength of at least about 1000 psi, an elongation of at least 400 percent, and a modulus at 100 percent elongation of no more than about 500 psi.

11. The glove according to claim 10, wherein said crosslinked film has a percent area swell of more than about 300 percent.

12. The glove according to claim 10, wherein the polymer latex composition has a gel content of no more than 85 percent.

13. The glove according to claim 10, wherein said glove further comprises a second polymeric film in contact with said glove to form a composite structure.

14. The glove according to claim 10, wherein said glove has a thickness ranging from about 3 mil to about 20 mil.

15. The glove according to claim 10, wherein the aromatic vinyl monomer is styrene.

16. The glove according to claim 10, wherein the conjugated diene monomer is butadiene.

17. The glove according to claim 10, wherein the component is an unsaturated acid monomer.

18. The glove according to claim 10, wherein the polymer latex composition further comprises a component selected from the group consisting of a urethane, epoxies, melamine-formaldehyde resins, a conjugated diene polymer, and blends thereof.

19. A glove comprising a crosslinked film formed from a polymer latex composition, the polymer latex composition comprising about 10 to about 40 weight percent of an aromatic vinyl monomer, about 55 to about 80 weight percent of a conjugated diene monomer, and about 1.5 to about 5 weight percent of a component selected from the group consisting of an unsaturated acid monomer, a partial ester of an unsaturated polycarboxylic acid monomer, and mixtures thereof, the polymer latex composition being devoid of natural rubber; wherein said film has a degree of crosslinking such that said glove has a tensile strength of at least about 1000 psi, an elongation of at least 400 percent, and a modulus at 100 percent elongation of no more than about 500 psi.

* * * * *